United States Patent [19]

Novinger

[11] 4,215,732
[45] Aug. 5, 1980

[54] PATTERN-CONTROLLED ROUTING MACHINE

[75] Inventor: Donald A. Novinger, Western Springs, Ill.

[73] Assignee: Danly Machine Corporation, Chicago, Ill.

[21] Appl. No.: 955,940

[22] Filed: Oct. 30, 1978

[51] Int. Cl.² .................... B27C 5/02; B23C 1/18
[52] U.S. Cl. .................... 144/145 A; 409/97; 409/104
[58] Field of Search ............ 51/105 R; 144/145 R, 144/145 A, 145 C, 154, 323; 409/85, 97, 104

[56] References Cited

U.S. PATENT DOCUMENTS

| 660,642 | 10/1900 | Keyes | 144/145 C |
|---|---|---|---|
| 1,567,865 | 12/1925 | Sawyer | 144/145 A |
| 2,107,578 | 2/1938 | Onsrud | 144/145 A |
| 3,447,420 | 6/1969 | Rhodes et al. | 409/97 |
| 3,459,104 | 8/1969 | Parsons, Sr. | 409/97 |
| 3,473,580 | 10/1969 | Dunn et al. | 144/145 R |
| 3,584,665 | 6/1971 | Gemmani | 144/145 A |
| 3,838,623 | 10/1974 | Schell | 409/104 |
| 3,880,048 | 4/1975 | Zimmerman | 409/97 |
| 4,036,269 | 7/1977 | Rhodes | 144/145 A |

*Primary Examiner*—W. Donald Bray
*Attorney, Agent, or Firm*—Leydig, Voit, Osann, Mayer & Holt, Ltd.

[57] ABSTRACT

A routing machine for routing a non-linear groove in a flat extensive workpiece having a pattern in the form of a curved rib temporarily secured to the underside thereof. A reference roller in alignment with the routing tool engages a reference surface on the pattern while a cooperating roller is biased against the opposite surface, the rollers being driven so that the pattern is advanced to move the workpiece relative to the tool. The cooperating roller is mounted upon a table which is freely rotatable about the axis of the reference roller so that when the rollers encounter a portion of the pattern which changes direction, the cooperating roller is free to change its orientation with respect to the reference roller thereby enabling the workpiece to retain its initial orientation regardless of changes in direction taken by the pattern. Both of the rollers are positively driven at the same peripheral speed but one of the rollers is smoothly surfaced for casual slippage with respect to the pattern in regions where the pattern changes direction. The cooperating roller is driven by a gear train which is mounted upon the table and which has an initial gear which is arranged coaxially with respect to the table.

12 Claims, 12 Drawing Figures

U.S. Patent  Aug. 5, 1980  Sheet 1 of 3  4,215,732
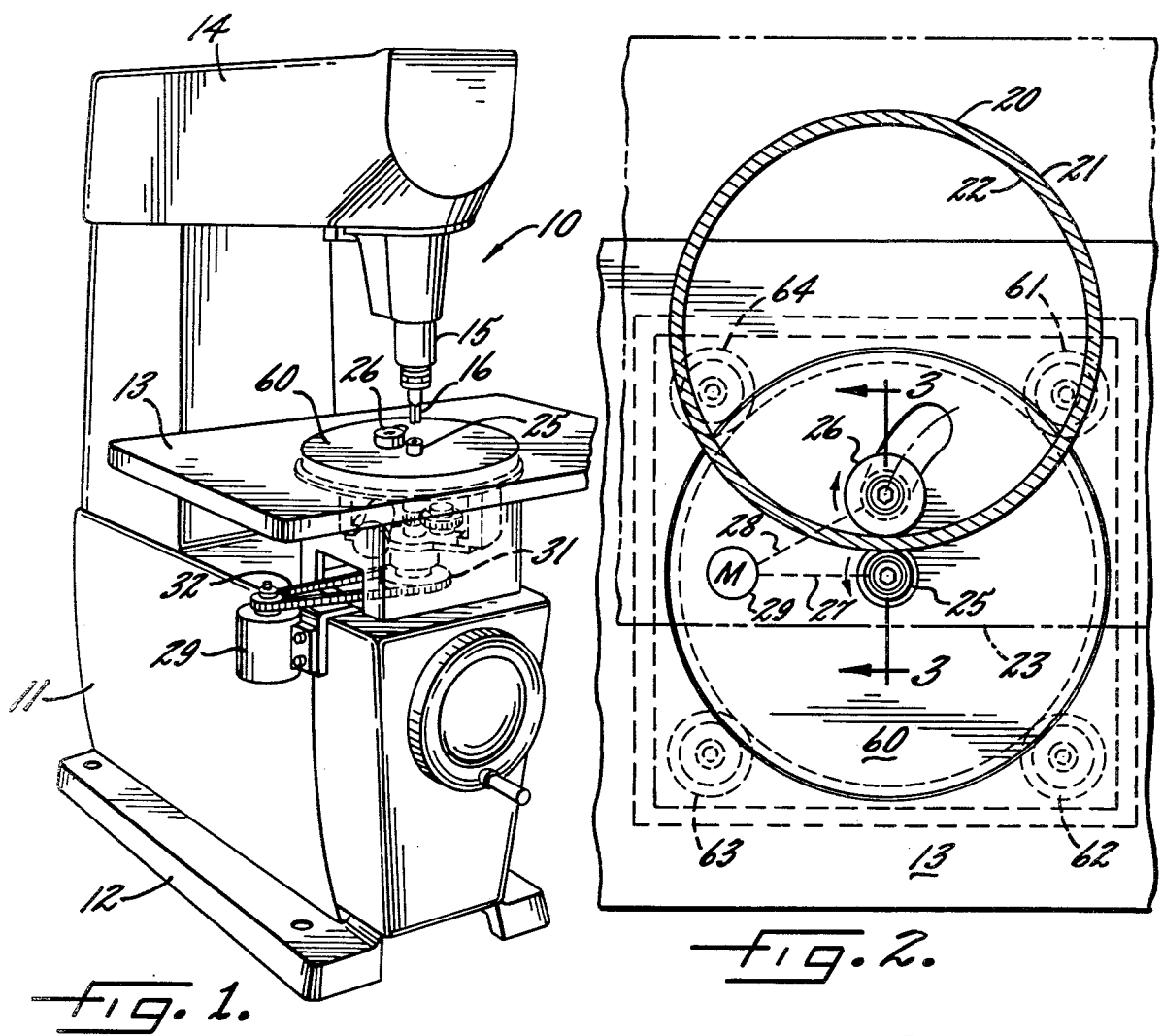
Fig. 1.
Fig. 2.
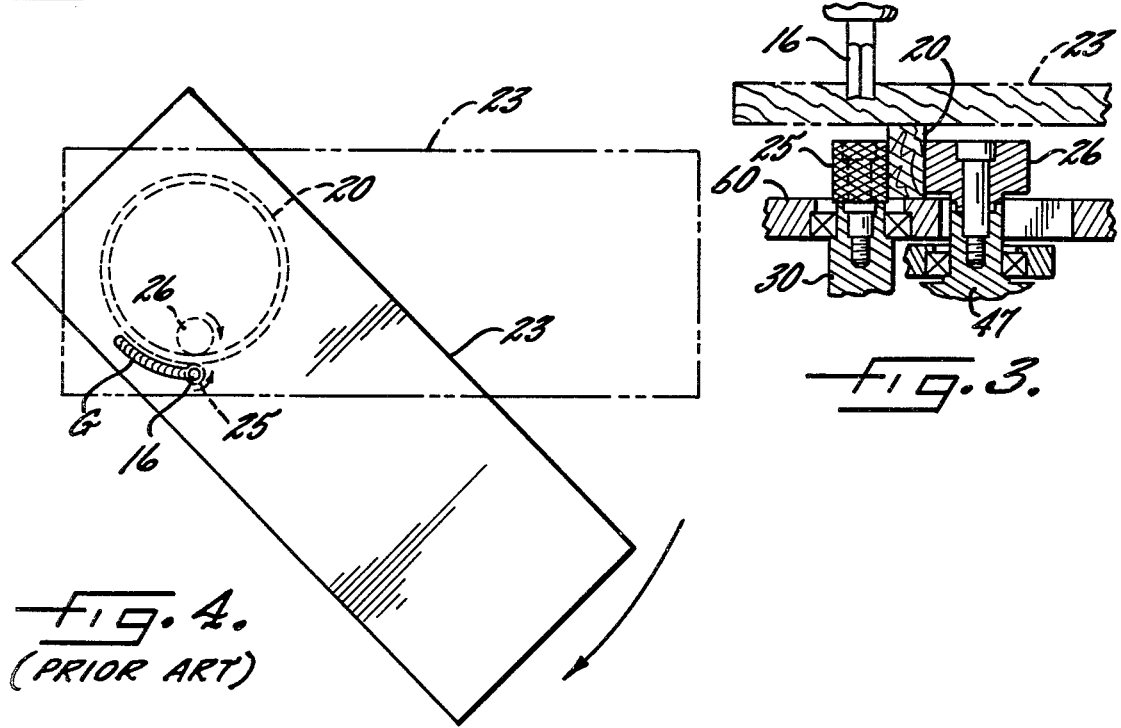
Fig. 3.
Fig. 4.
(PRIOR ART)

PATTERN-CONTROLLED ROUTING MACHINE

Purdy U.S. Pat. No. 569,054 is an early example of the use of a pair of rollers in a routing machine, the rollers having a pattern or template between them to which the workpiece is fixed for guiding the workpiece along a predetermined path of movement with respect to the routing tool. Further examples of the use of this principle over the years are to be found in Sawyer U.S. Pat. No. 1,567,865, Onsrud U.S. Pat. No. 2,107,578, Dunn et al. U.S. Pat. No. 3,473,580, Parsons U.S. Pat. No. 3,459,104 and Gemmani U.S. Pat. No. 3,584,665. However, in the machines shown in all of these patents the rollers bear a fixed orientation with respect to one another so that it is necessary for the workpiece to swing laterally when cutting a non-linear groove, for example, a groove of circular or rectangular contour. In the case of the Zimmerman U.S. Pat. No. 3,880,048 where the workpiece is pivotally mounted it is necessary for the workpiece to swing laterally even though the rollers are mounted so that one can oscillate through an angle about the other. In the case of a large workpiece, and employing a high rate of feed, the workpiece may swing with considerable velocity and momentum endangering the operator of the machine. The swinging movement of the workpiece has, in addition, severely limited the size of workpiece which can be acted upon by a machine having a limited throat clearance dimension between the routing tool and the vertical portion of the frame.

It is, accordingly, an object of the invention to provide an improved routing machine of the pattern-controlled type which does not require the orientation of the workpiece to be changed incident to a change in the direction of the pattern and resulting groove. It is a related object to provide a routing machine of the pattern-controlled type which permits the routing of large workpieces in a continuous cut on a machine of relatively small size and having a small throat clearance dimension.

It is another object to provide an automatic routing machine in which the workpiece is fed into the routing tool by power driven means but in which the workpiece is, notwithstanding changes in direction of the pattern, kept in the same orientation from the beginning to the end of the cut, producing a routing machine which is much safer than conventional machines and in which there is no danger of the workpiece being forcibly swung in the direction of the operator, thus protecting not only the operator but the workpiece and the machine itself.

It is a general object of the invention to provide a routing machine of the pattern-controlled type which, in spite of its important operating advantages, is economically and compactly constructed and in which the invention adds very little cost to that of the basic machine. In this connection it is an object to provide an improvement which can be added at minor expense to existing designs of routing machines, not only new machines but machines already in the field.

Other objects and advantages of the invention will become apparent upon reading the attached detailed description and upon reference to the drawings in which:

FIG. 1 is a perspective view of a routing machine constructed in accordance with the present invention.

FIG. 2 is a fragmentary plan view of the work support of the machine of FIG. 1 showing the propelling of a circular pattern between the pattern drive rollers.

FIG. 3 is a fragmentary vertical section looking along line 3—3 of FIG. 2.

FIG. 4 is a diagram showing, in plan view, the swinging of the workpiece which occurs with conventional routing machines as the pattern drive rollers encounter a portion of the pattern which changes direction.

Figure 5A:
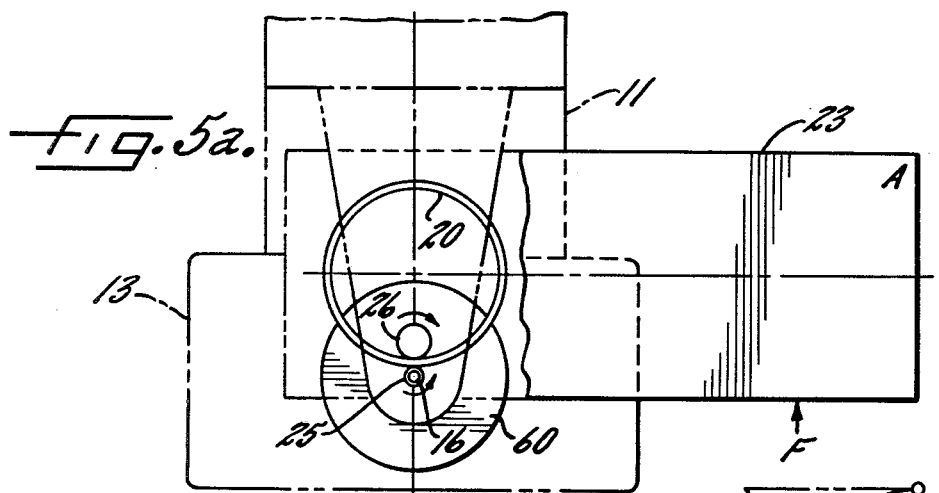
FIGS. 5a–5d are a set of stop motion diagrams similar to FIG. 4 but showing the maintenance of a workpiece in constant orientation as permitted by the present invention.

While the invention has been described in connection with a preferred embodiment, it will be understood that I do not intend to be limited to the embodiment shown but intend, on the contrary, to cover the various alternative and equivalent forms of the invention included within the spirit and scope of the appended claims.

Turning now to FIG. 1 there is shown a routing machine 10 employing the inventive features and which has a frame 11 mounted upon a base 12. The frame has a horizontal work support 13. The upper portion 14 of the machine overhangs the support and journals a spindle 15 which is driven at high speed by conventional means, the spindle carrying a routing tool 16 which is arranged perpendicularly and opposite to the work support.

In routing tools intended for production purposes it has been known, as shown in the above patents, to provide a pair of rollers at the work support engaging a pattern or template in the form of a non-linear rib, that is, a rib which undergoes a change in direction. Thus I provide a pattern 20 having a reference surface 21 and an opposite surface 22, the surfaces being generally parallel to one another and extending at right angles to a workpiece 23, the pattern being temporarily secured to the under surface of the workpiece as shown in FIG. 3. It will be understood by one skilled in the art that for precise location of the pattern with respect to the workpiece on a production basis, the pattern may have, permanently secured to its upper edge, a platform to which the workpiece in turn is secured and with respect to which it is oriented.

The pattern is engaged between a pair of pattern drive rollers including a reference roller 25 aligned with the tool 16 and a cooperating roller 26, the rollers having respective drive connections 27, 28 to a power source in the form of a motor 29 such that both of the rollers are driven at substantially the same peripheral speed.

In the operation of the structure as thus far described, rotation of the pattern drive rollers 25, 26 in the direction indicated by the arrows (FIG. 4) causes the pattern 20 to be propelled along a predetermined path relative to the tool, thereby producing a groove G of the same configuration as the pattern accompanied by swinging of the workpiece 23 in the direction of the large arrow, giving rise to a hazardous condition.

In accordance with the present invention the cooperating roller 26, instead of being fixedly oriented with respect to the reference roller 25 is mounted so that it is bodily freely swingable about the axis of the reference roller. More specifically the cooperating roller 26 is eccentrically mounted upon a circular table which is freely rotatable and which is concentric with the reference roller and the routing tool.

Figure 6:
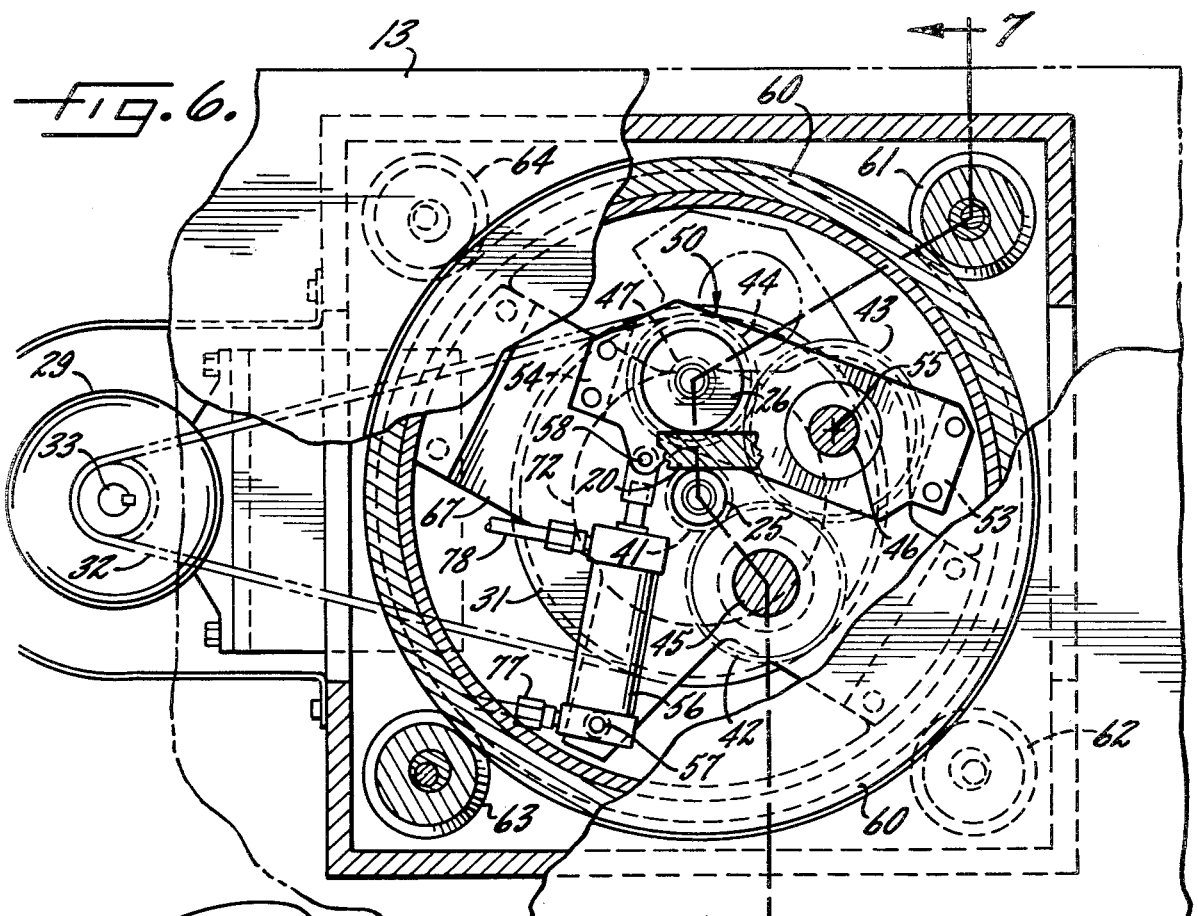
FIG. 6 is a view taken from the same vantage point as FIG. 2 but with a portion of the table removed in order to reveal the roller drive train.
Figures 7A, 8:
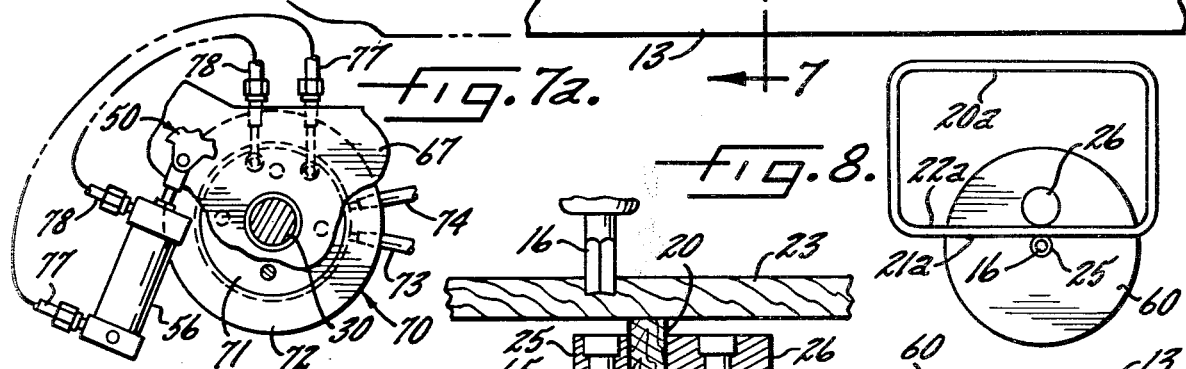
FIG. 7a is a fragmentary section taken along line 7a—7a in FIG. 7.
FIG. 8 is a further example of pattern configuration which may be utilized in practicing the invention.
Figure 7:
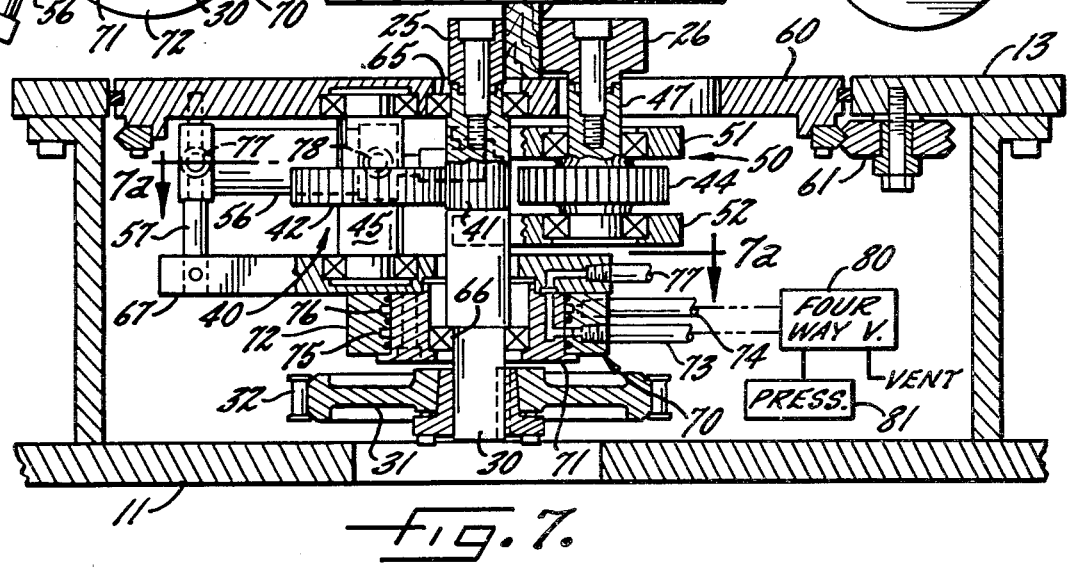
FIG. 7 is a broken vertical section taken along line 7—7 in FIG. 6.

Turning to FIGS. 6 and 7, attention will first be given to the means for driving the two rollers. First of all, the roller 25 is mounted upon a central shaft 30 which is concentric with the routing tool 16 and which has, at its lower end, a drive pulley 31 which is coupled, by a chain or belt 32 to the shaft 33 of the drive motor 29.

For the purpose of driving the cooperating roller 26, a gear train 40 is provided consisting of gears 41–44, the initial gear 41 of the train being in the form of a pinion concentric with the reference roller and located on the upper portion of shaft 30. The gears 42–44 have shafts 45–47, respectively, the shaft 47 being directly coupled to, and coaxial with, the cooperating roller 26. The ratio of the gears 41–44 is such that the two rollers are positively driven at the same peripheral speed. In the present instance, since the cooperating roller 26 is twice the diameter of the reference roller 25, the shaft 47 upon which it is mounted rotates at half speed.

Biasing means are provided for pressing the cooperating roller 26 toward the reference roller 25 and into engagement with the pattern 20. Biasing movement is achieved by mounting the final drive gear 44, which is integral with the cooperating roller 26, on an arm which is horizontally swingable about a pivot which coincides with the axis of the cooperating gear 43. Referring to FIG. 6, an arm 50 is provided which is made of two spaced apart plates of metal 51, 52 bridged at the ends by spacers 53, 54. The arm is swingable about a vertical axis 55 which is concentric with shaft 46 of gear 43. For application of biasing force to the arm 50, a pneumatic actuator 56 is provided which is anchored at one end 57 and which has a plunger which is connected to the arm at a pivot point 58. It will be apparent that the degree of biasing force may be precisely controlled by controlling the applied pressure.

For the purpose of mounting the cooperating roller 26 so that it is bodily freely swingable about the axis of the reference roller 25, an auxiliary rotatable table 60 is provided. The table mounts not only the cooperating roller 26 but the gear train 40 which drives it, the arm 50 on which the roller 26 is mounted for biasing purposes and the actuator 56 which provides the bias. Preferably the table is of circular shape and is centrally mounted in a circular clearance opening in the work support 13 so as to be flush with the latter. The table is supported at its periphery on rollers 61–64 which are in turn mounted on the surrounding work support. The table has a clearance opening at its center mounting a bearing 65 which surrounds the drive shaft 30 to provide support for the latter. The lower end of the shaft 30 is supported in a bearing 66 mounted in a bracket member 67 which is rigidly secured to the table. Since the shaft 30 rotates at a relatively slow speed, at least as compared to the speed of the routing tool, simple supporting structure for the shaft 30 is adequate.

It is one of the features of the present invention that control means are provided for applying pressure to the actuator 56 to provide bias to the cooperating roller 26 and for, alternatively, retracting such roller from the pattern. Such feeding of air is accomplished by a pneumatic slip ring assembly indicated at 70 having a slip ring 71 which rotates with the table, being fixed to the table-mounted bracket member 67, and a collar 72 which remains stationary with respect to the frame of the machine. Air is supplied under pressure, or alternatively vented, via connections 73, 74 which communicate with 360-degree internal grooves 75, 76, respectively, in the collar 72. Connection is made continuously with the grooves, regardless of orientation of the table, to connections 77, 78 leading to the respective ends of the actuator 56, the porting for the connections 77, 78 being preferably integrally incorporated in the bracket member 67 as shown (see FIG. 7a). The stationary input lines 73, 74 are under the control of a four-way valve 80 which receives air from a pressurized source 81 having a regulated pressure level.

Because the cooperating roller 26 is eccentrically mounted upon the table 60 which is freely rotatable, the cooperating roller 26 is free to orbit through an angle 360 degrees about the reference roller 25 so that the rollers may perform their driving function, and the reference roller its referencing function, regardless of the orientation of the workpiece. Stated in other words, it is possible to keep the orientation of the workpiece constant by light manual restraining pressure over the entire cycle of a pattern in the form of a closed loop. This is illustrated in the stop motion views FIGS. 5a–5d which show the position of the workpiece at the start of groove formation and which show that the workpiece, although undergoing orbital movement, maintains its initial orientation as the groove is progressively completed. FIG. 5a shows the initial condition of the table 60 with the reference roller 25 and cooperating roller 26 being aligned front-to-back and with the tool 16, which is concentric with the table and with the reference roller, about to begin cutting of the groove. As the rollers 25, 26 propel the pattern 20, and the workpiece 23 which is secured to it, a slight torque exists in the workpiece in a clockwise direction, which is resisted by the operator's applying a light manual counterforce in the direction indicated by the arrow F.

Figure 5B:
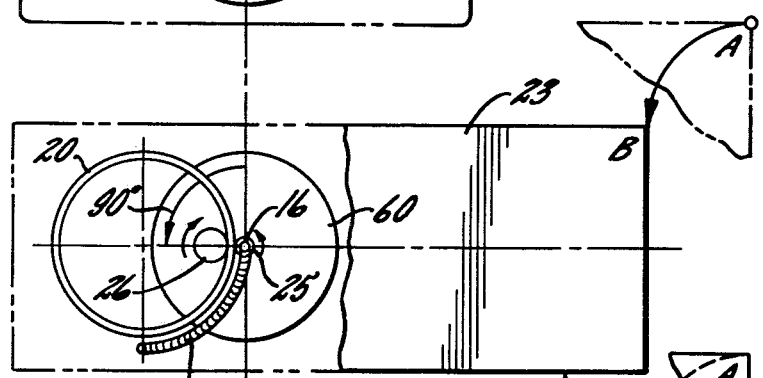

Since the workpiece is restrained from swinging, it is necessary for the cooperating roller 26 to accommodate the relative change in direction of the pattern, which it does by rotating progressively in the counterclockwise direction. Thus during the cutting of the first 90 degrees of arc of the groove G as shown in FIG. 5b, the table 60 rotates counterclockwise through an angle of 90 degrees as indicated by the arrow on the face of the table. That the workpiece undergoes corresponding orbital movement, without changing its orientation, is indicated by the fact that the corner of the workpiece which starts at position A moves through a 90 degree arc of orbital movement to position B.

Figure 5C:
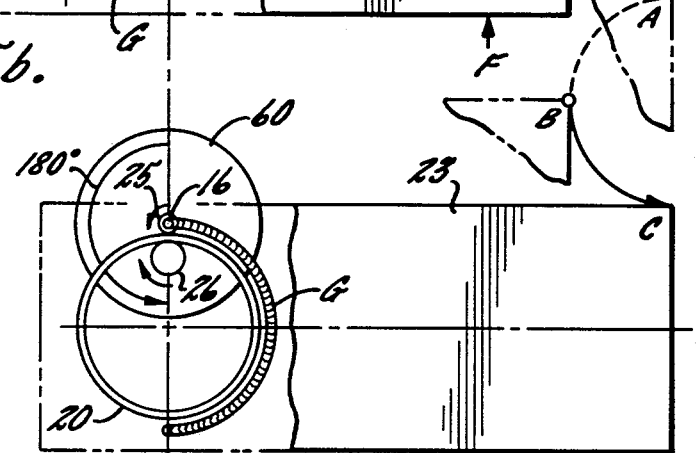
Figure 5D:
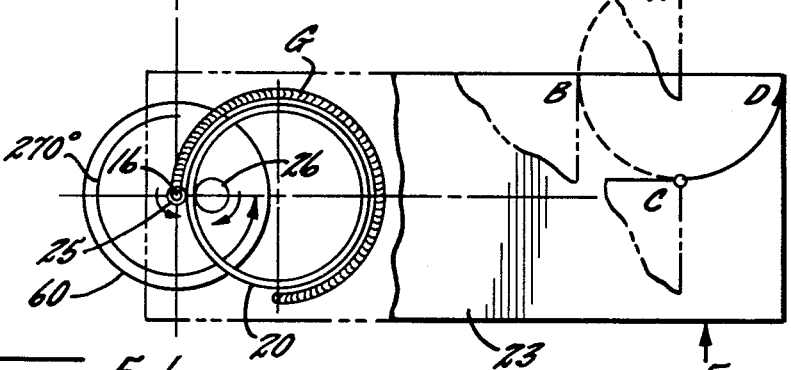

Turning next to FIG. 5c, which shows completion of 180 degrees of groove, the workpiece continues to be restrained and in its initial orientation, while the table 60, and the roller 26 mounted thereon accommodatingly rotates through an angle of 180 degrees. The corner of the workpiece likewise completes 180 degrees of orbital movement to position C. Similarly, when the groove G is completed to the extent of 270 degrees, the table has accommodatingly moved through the same angle while the workpiece completes 270 degrees of orbital motion. The final 90 degree arc of groove restores the initial condition of workpiece and table illustrated in FIG. 5a.

While the operation has been discussed in connection with a circular groove, it will be understood that the same sequence is applicable to a groove of rectangular configuration produced by a rectangular pattern 20a as shown in FIG. 3. Indeed, cutting a rectangular groove, or any groove with abrupt changes in direction, causes the workpiece, in conventional routers, to swing at correspondingly increased angular rate, emphasizing the degree of hazard now solved by the present invention. Also, while the invention is particularly applicable to the routing of grooves of loop configuration, it will be understood by one skilled in the art that the invention is equally applicable to grooves which are blind at the ends either by providing the pattern with appropriate stop surfaces, to inhibit feeding beyond a certain point, or by operator intervention in the routing process.

In any event, due to lack of swing of workpiece, large workpieces can be accommodated in routers having relatively limited throat dimension.

In accordance with one of the aspects of the present invention, both of the rollers 25, 26 are positively driven, with one of the rollers being surfaced for reliable gripping of the pattern while the other roller is smoothly surfaced permitting relative slippage or skidding action. Thus roller 25 may be provided with a knurled surface while roller 26 is smooth; however, it is preferred to roughen, or frictionally surface, the larger roller 26, since it has a greater surface area in driving contact, for more or less positive traction on the presented surface of the pattern, while roller 25 is smoothly surfaced for intentional limited skidding as the pattern changes direction. Such skidding comes about by the fact that speed of passage of the presented surfaces on the pattern are identical only over the straight portions of the pattern and differ wherever there is a curve or change in direction. In short, the roller 26 thus tends to "overdrive" upon engaging a concave portion of the pattern and to "underdrive" upon engaging a convexity. In the prior art Gemmani patent velocity accommodation is provided by a slipping clutch interposed in the drive train of one of the rollers thereby enabling such roller to rotate at a variable peripheral speed with respect to the other roller. It is one of the features of the present invention that no slipping clutch is necessary and that both of the rollers 25, 26 constantly rotate at the same peripheral speed with respect to one another. The present invention may, however, be employed with the Gemmani clutch if desired and without sacrifice of the main "work orientation" feature of the invention.

In spite of the fact that the roller 25 is smoothly finished, and preferably of metal, experience shows that its coefficient of friction with respect to the engaged surface of the pattern is still high enough to provide a substantial amount of propelling torque to the pattern, thereby justifying the use of separate positive driving connections for the individual rollers. However, the invention is one of its aspects is not limited to positive driving of each of the rollers directly from the power source and, if desired, only the frictionally surfaced roller (here 25) need be positively driven while the companion roller 25 may be indirectly driven through its engagement with the opposite side of the pattern. Thus when reference is made to "means for driving the rollers" I intend to include such indirect as well as direct driving.

The invention is particularly applicable to cutting of grooves of non-linear configuration by employing a pattern in the form of a rib having changes in direction and hence curved portions. However, the invention is not limited to this and is also advantageous in the cutting of straight or linear grooves under the control of a straight or linear pattern fixed to the workpiece, particularly where the workpiece is of large size as compared to the throat dimension of the routing machine.

While the invention has been described in connection with a conventional router in which the routing tool occupies the top position so that the pattern is on the "underside" of the workpiece, it will be apparent that the latter is a relative term and routing may take place, if desired, in other orientations of the machine without in any way departing from the invention.

Also while the invention has been described in terms of cutting a typical two-sided groove, the invention is not limited thereto and includes the cutting or shaping of other surfaces along a path determined by the pattern; for example, the invention is well suited for shaping the edge of a table top or the like. Consequently the term "groove," it will be understood, is intended to be generic to grooves and the like.

In the drawings the larger, or cooperating, roller is shown engaging the inside surface of the pattern; however, it is preferred, especially when using patterns having relatively sharp corners to engage the inner surface of the pattern with the roller of lesser diameter. The invention includes both possibilities.

What I claim is:

1. In a routing machine especially intended for routing a 360° non-linear groove at one end of a flat longitudinally extensive workpiece, the combination comprising a frame, an extensive work support on the frame, a routing tool journaled in the frame perpendicularly and opposite to the work support and having means for rotating the same at high speed, a pattern in the form of a curved rib extending about an angle of 360° temporarily secured to the underside of the workpiece and having a radially facing reference surface and an opposite surface, the surfaces being generally parallel to one another and extending at right angles to the workpiece, a reference roller journaled in a position centrally of the work support and engaging the reference surface on the pattern, the reference roller being permanently mounted in coaxial alignment with the routing tool, a cooperating roller engaging the opposite surface on the pattern and having biasing means for pressing the cooperating roller toward the reference roller and into engagement with the pattern, means for driving the rollers so that the pattern is advanced between the rollers carrying with it the workpiece which moves relatively to the routing tool to produce a groove shaped in accordance with the pattern, and means for mounting the cooperating roller so it is bodily freely swingable about the axis of the reference roller so that when the rollers complete a traverse of the 360° pattern the cooperating roller also undergoes a change of orientation of 360° with respect to the reference roller, the workpiece being freely supported with respect to the work support for shifting movement in all directions thereby enabling the workpiece to be retained in its initial orientation free of lateral swinging movement during the cut regardless of changes in the direction taken by the pattern.

2. The combination as claimed in claim 1 in which the means for driving the rollers includes a power source as well as a positive driving connection between the power source and each of the rollers for driving of the rollers at substantially the same peripheral speed, one of the rollers being smoothly surfaced for casual slippage with respect to the pattern in regions where the pattern changes direction.

3. The combination as claimed in claim 2 in which the reference roller is smoothly surfaced and in which the cooperating roller is frictionally surfaced for primary driving engagement of the pattern.

4. The combination as claimed in claim 2 in which the other one of the rollers has a knurled surface.

5. The combination as claimed in claim 1 in which the cooperating roller is mounted upon an arm swingable about a pivot connection which is eccentrically located with respect to the reference roller and in which the driving means includes a power source and a gear train interposed between the power source and cooperating roller, one of the gears in the train being coaxial with the arm pivot connection to insure positive driving of the cooperating roller in all positions of swing of the arm.

6. The combination as claimed in claim 1 in which the cooperating roller is mounted upon an arm swingable about a pivot connection which is eccentrically located with respect to the reference roller and in which the driving means includes a power source and a gear train interposed between the power source and cooperating roller, the first gear in the train being coaxial with the reference roller and one of the gears in the train being coaxial with the arm pivot connection to insure positive driving of the cooperating roller in all positions of the arm.

7. The combination as claimed in claim 1 in which the work support includes a rotatable table which is coaxial with the reference roller and freely swingable with respect thereto, the cooperating roller being mounted upon the rotatable table.

8. The combination as claimed in claim 7 in which the rotatable table has a circular periphery and in which spaced rollers are provided at the periphery for supporting the table.

9. The combination as claimed in claim 8 in which the table has a bracket member secured thereto on its underside, the bracket member being spaced downwardly from the table, the reference roller being mounted on a vertical shaft, and bearings on the table and bracket member, respectively, for journaling the shaft.

10. The combination as claimed in claim 1 in which the work support includes a rotatable table which is coaxial with the reference roller and freely swingable with respect thereto, the cooperating roller being mounted upon the rotatable table, the biasing means being in the form of a pneumatic actuator mechanically coupled to the cooperating roller, a source of pressurized air, and means including a pneumatic slip ring secured to the table and operative in all angular positions thereof for feeding air from the source to the actuator.

11. In a routing machine especially intended for routing a non-linear groove in a flat extensive workpiece, the combination comprising a frame, a routing tool journaled in the frame and having means for rotating the same at high speed, a pattern in the form of a curved rib temporarily secured to the underside of the workpiece and having a radially facing reference surface and an opposite surface, the surfaces being generally parallel to one another and located at right angles to the workpiece, a circular table coaxially arranged with respect to the routing tool and mounted for free rotation with respect to the frame of the machine, a reference roller mounted coaxially with respect to the table and projecting above the table for engagement with the reference surface on the pattern, a cooperating roller engaging the opposite surface of the pattern, the cooperating roller being eccentrically mounted on the table and having biasing means for pressing the cooperating roller toward the reference roller and into engagement with the pattern, means for driving the rollers at substantially the same peripheral speed so that the pattern is advanced between the rollers carrying with it the workpiece which moves relatively to the routing tool to produce the groove, at least one of the rollers being smoothly surfaced to permit casual slippage as the rollers engage a portion of the pattern which changes direction.

12. In a routing machine especially intended for routing a non-linear groove in a flat extensive workpiece, the combination comprising a frame, an extensive work support on the frame, a routing tool journaled in the frame perpendicularly and opposite to the work support and having means for rotating the same at high speed, a pattern in the form of a curved rib temporarily secured to the underside of the workpiece and having a reference surface and an opposite surface, the surface being generally parallel to one another and located at right angles to the workpiece, the work support including a circular table coaxially arranged with respect to the routing tool, a reference roller mounted coaxially with respect to the table and projecting above the table for engagement with the reference surface on the pattern, a cooperating roller engaging the opposite surface on the pattern, the cooperating roller being eccentrically mounted on the table and having biasing means for pressing the cooperating roller toward the reference roller and into engagement with the pattern, a power source, a positive driving connection between the power source and the reference roller, a gear train between the power source and the cooperating roller for driving the cooperating roller at substantially the same peripheral speed as the reference roller so that the pattern is advanced between the rollers carrying with it the workpiece which moves relatively to the routing tool to produce the groove, the circular table being mounted for free rotation with respect to the frame of the machine so that when the rollers encounter a portion of the pattern which changes direction the cooperating roller is free to change its orientation with respect to the reference roller, thereby enabling the workpiece to retain its initial orientation regardless of the changes in direction taken by the pattern, the gear train being carried by the table and having an initial gear which is coaxial with respect to the table so that a driving connection is maintained to the cooperating roller in all positions of the table.

* * * * *